Feb. 7, 1956     C. R. MYERS     2,733,780
FLUID-OPERATED DISC BRAKE AND NOISE ELIMINATING MEANS THEREFOR
Filed Oct. 8, 1952     5 Sheets-Sheet 1

INVENTOR
C. R. Myers
BY Robb & Robb
Attorneys.

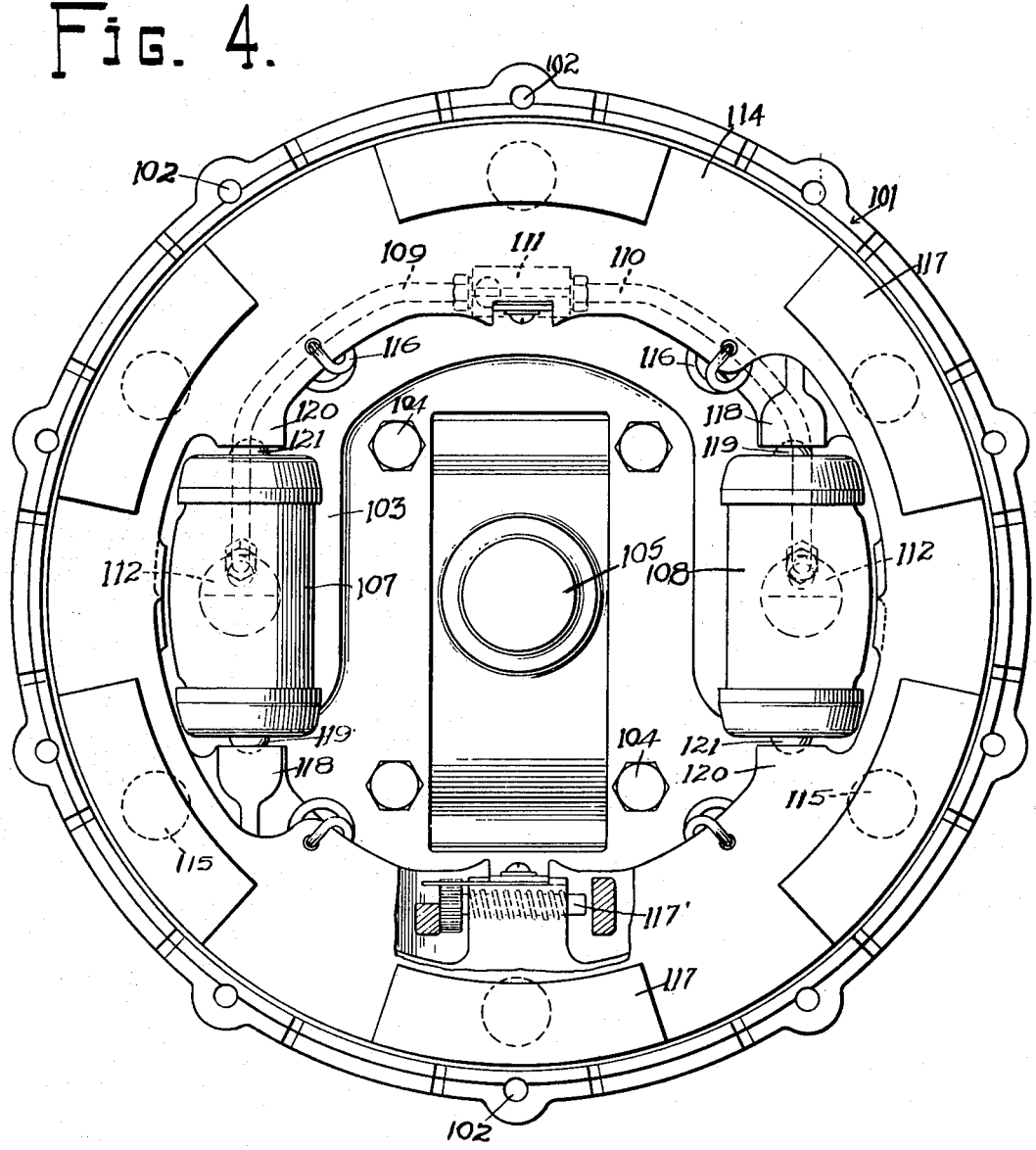

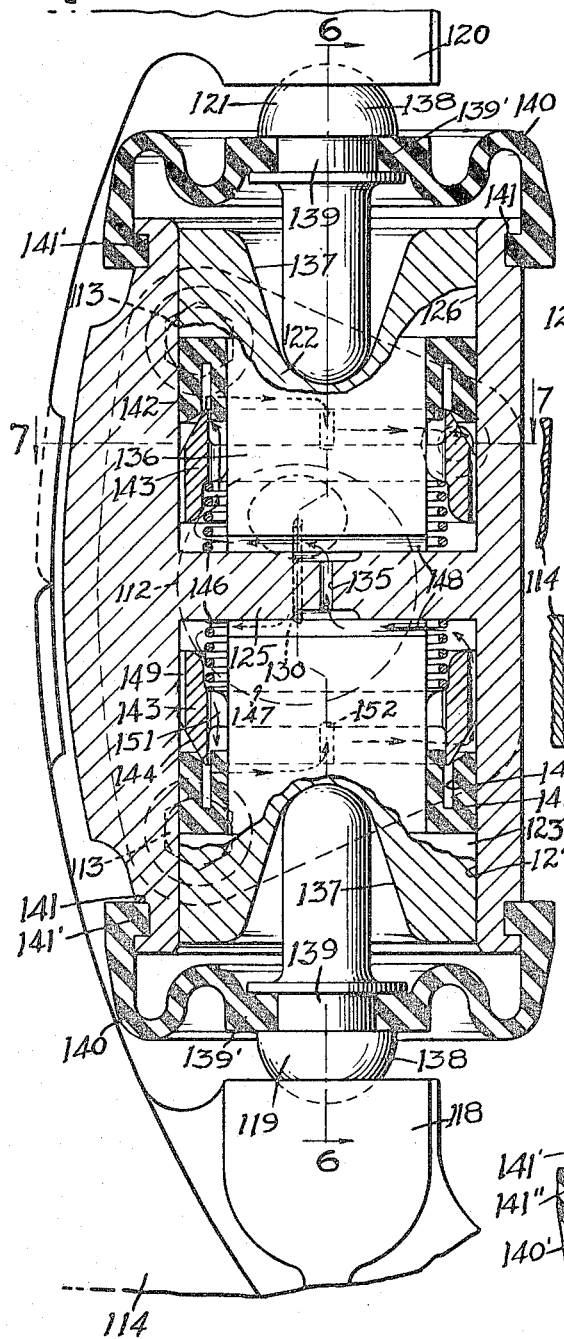

Feb. 7, 1956 C. R. MYERS 2,733,780
FLUID-OPERATED DISC BRAKE AND NOISE ELIMINATING MEANS THEREFOR
Filed Oct. 8, 1952 5 Sheets-Sheet 5

INVENTOR
C. R. Myers
BY
Robby Cobb
Attorneys

United States Patent Office 2,733,780
Patented Feb. 7, 1956

2,733,780

FLUID-OPERATED DISC BRAKE AND NOISE ELIMINATING MEANS THEREFOR

Claude R. Myers, Galien, Mich., assignor, by mesne assignments, to Lambert Brake Corporation, St. Joseph, Mich., a corporation of Michigan Application October 8, 1952, Serial No. 313,643

13 Claims. (Cl. 188—152)

The present invention relates to disc brakes, and more particularly to disc brakes in which the friction discs are wholly supported on the actuator means therefor.

The present-day trend in the passenger or pleasure car field is towards greater horsepower with attendant higher-and-higher speeds, and towards improved automatic transmissions with attendant reduction in the effective braking action of the vehicle engines. However, the automobile industry has not made comparable advances in the brakes for the powerful, fast, heavy modern-day automobiles, with the result that oftentimes the brakes for these automobiles are not adequate. This is particularly true when the vehicle is descending steep grades or when the brakes are applied frequently and repeatedly to slow the vehicle down or stop the same from relatively high speeds, at which times the effectiveness of conventional drum-and-shoe brakes is rapidly diminished due to vaporization of the usual fluid operating medium for the brakes due to excessive drum and friction shoe heat generated during the braking operation, with resultant diminution of the power of the brakes.

In an effort to overcome these difficulties, self-energizing brakes have been developed, which brakes utilize the torque of the brake housing or drum to increase the brake-applying power of the friction elements. Outstanding in the field of self-energized brakes for passenger car use, as well as for heavy-duty use, is a type of disc brake embodying an inner double-disc assembly having opposed radially disposed friction faces engageable with opposed friction faces of the brake housing which is connected to the vehicle wheel for rotation therewith. The inner double-disc assembly is concentrically supported on or piloted by a pair of diametrically disposed hydraulic actuator cylinders which serve to slightly rotate the discs in opposite directions relative to each other. Camming balls are disposed between the discs and engaged in oppositely inclined, ramped seats in the opposed inner faces of the discs, these balls acting to spread the discs axially apart responsive to the aforementioned rotative or angular movements of the discs. In order to effectuate self-energization of this disc brake, one disc, upon initial engagement with the rotary housing, clocks with the housing until a portion of the disc engages and anchors on a stationary part or a portion of the actuator cylinders, while the other disc continues to rotate responsive to fluid pressure in the actuators and responsive to frictional engagement with the rotary housing. Thus the camming balls spread the discs apart with an extremely powerful servoaction proportional to the torque of the rotary member and the fluid pressure.

Such disc brakes are subject to "clunking" noises when the discs anchor on a stationary part, as are all self-energizing brakes wherein a friction element is shifted up against an anchor upon application of the brake. In addition, however, some disc brakes are also inclined to rattle due to vibrations of the inner disc assemblies responsive to road shock. This rattle problem is characteristic of disc brakes of the aforesaid type when the actuator cylinders are disposed out of horizontal positions, i. e., when the cylinders are mounted with their axes disposed either vertically or intermediate a vertical position and a position approaching horizontal. This rattling is primarily due to the relation of the components of the disc brakes of this type when the brake is inactive, and this relation is not present in other forms of brakes such as the conventional drum-and shoe type of brake.

Obviously, any noise during braking operation of the brakes of a pleasure car or due to road shock when the brakes are inactive is undesirable, since, along with the trend towards more power and speed, the newer pleasure cars have been improved to obviate as much noise from engines, gears, brakes and the like as possible.

Accordingly, it is a primary object of the present invention to provide a relatively noise-free disc brake having tremendous braking power which is not seriously affected by repeated stops from relatively high speeds or by prolonged braking action, thus providing a brake of the capacity necessary to safe operation of the present-day high-powered, fast, heavy automobiles.

Another object is to provide such a brake which is self-energizing and includes means to obviate clunking noises due to anchoring of the brake elements during brake operation.

Still another object is to provide such a brake which includes means to obviate any rattling noises in the brake due to road shock.

A further object is to provide a relatively noiseless disc brake which is extremely easy to engage by reason of the friction discs thereof being freely and fully floating on the actuator cylinders therefor, thus enabling the brake to be applied with a minimum of pedal pressure on the usual brake pedal of an automobile, as distinguished from the relatively heavy pedal pressure required by most brakes now in use.

The foregoing objectives are preferably attained by a disc brake construction embodying an inner double-disc assembly comprising a pair of discs disposed in back-to-back relation, a plurality of balls disposed between the discs and seating in opposed, oppositely inclined ramped seats in the inner faces of the discs, tension springs holding said discs in assembled relation, with the balls confined therebetween, the discs each having a pair of diametrically spaced peripheral lugs thereon with one lug of each disc in opposed, spaced relation to one lug of the other disc. The brake also preferably includes a pair of fixed diametrically spaced actuator cylinders of the double-acting type having a pair of opposed pistons reciprocably mounted therein, the actuator cylinders each having a centrally located partition disposed between the pistons, and this partition having a small orifice therethrough, the inner double-disc assembly being supported on the pistons in such a manner as to be substantially free of frictional contact with any other portion of the actuator cylinders and free to float about the cylinders; and each piston being adapted to anchor on a portion of the actuator cylinder so as to anchor one or the other of the discs, with the restricted orifice in the central partition of each actuator serving to restrict the flow of fluid therethrough to damp inward movements of the pistons so as to cushion anchoring movements of the respective discs, with resultant obviation of anchoring clunks or noises.

Further, the foregoing objectives are attained by the provision of an inlet port for admitting pressure fluid into the cylinder, which port is of a diameter smaller than the diameter of the orifice through the partition, thus precluding fluid from being pumped back into the fluid line through the inlet port responsive to pumping actions of the actuator pistons due to vibrations of the inner disc assembly, which are caused by road shock when the brake is inactive, thereby rendering the orifice through the central partition fully effective to damp such vibrations of the inner disc assembly, with resultant obviation of rattle of the inner disc assembly.

Other objects and advantages of this invention will be hereinafter described or will become apparent to those skilled in the art, and the novel features thereof defined in the appended claims.

In the accompanying drawings:

Fig. 4 is a view in side elevation of a modified brake embodying the present invention, with the outboard side of the housing broken away to expose the interior of the brake assembly;

Fig. 5 is an enlarged view partly in elevation and partly in section of one of the actuator cylinders of the brake of Fig. 4, showing portions of the discs which are operated and controlled by the actuator cylinder;

Fig. 6 is a view in vertical section, as taken on the line 6—6 of Fig. 5, with certain of the parts shown in elevation;

Fig. 7 is a view in horizontal section, as taken on the line 7—7 of Fig. 5;

Fig. 8 is a plan view of one of the fluid-directing expander rings which are adapted to encircle the pistons and cause the fluid within the piston chambers to travel in a tortuous path when the actuator is being bled;

Fig. 9 is a view in vertical section, as taken on the line 9—9 of Fig. 8;

Fig. 10 is a transverse sectional view of an annular sealing member which is utilized to seal each piston in its piston chamber; and Fig. 11 is a fragmentary view in vertical section of a modified form of actuator cylinder and piston made in accordance with the present invention.

Like reference characters designate corresponding parts in the several views of the drawings.

Figure 1:
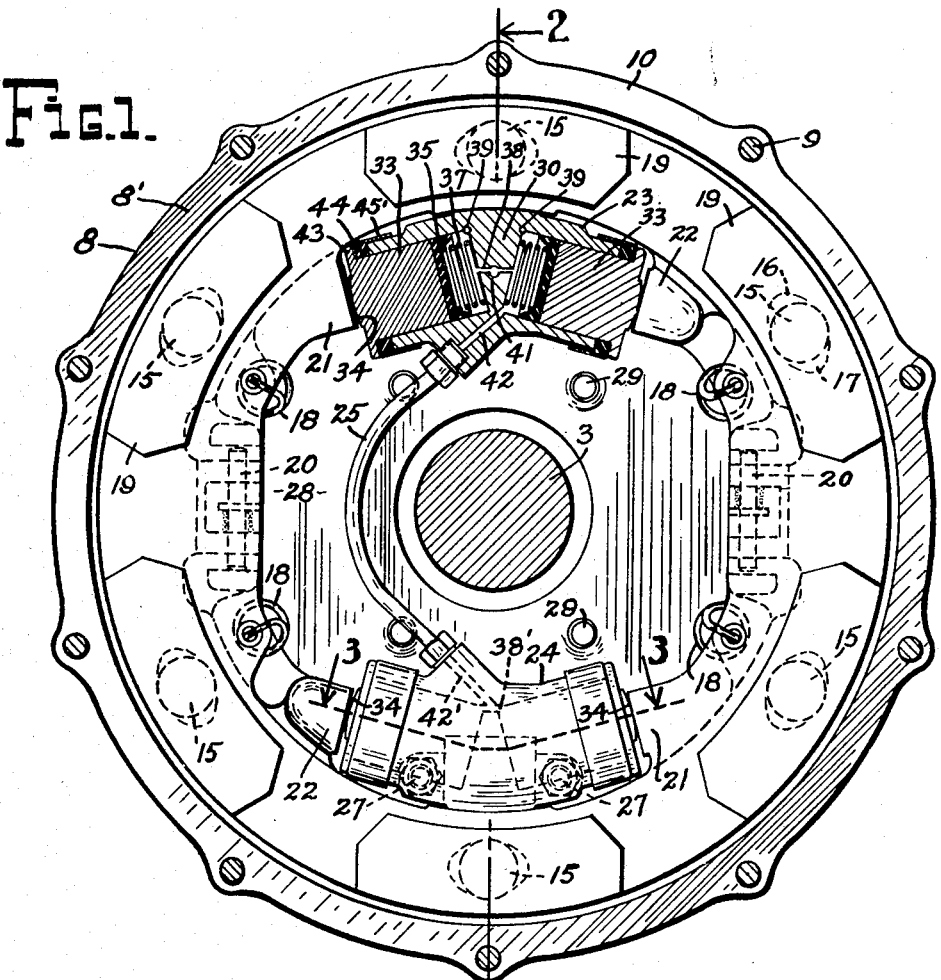
Fig. 1 is a view in side elevation of a brake embodying the present invention, with the outboard side of the housing broken away to expose the interior of the brake assembly, and a portion of one of the actuator cylinders being broken away and shown in section, this view representing a section on the line 1—1 of Fig. 2.
Figure 3:
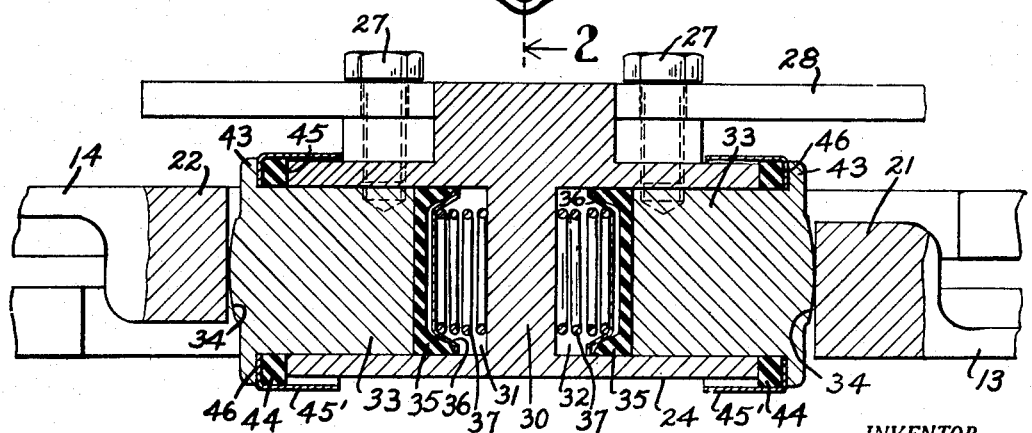
Fig. 3 is an enlarged fragmentary sectional view taken on the line 3—3 of Fig. 1, with the brake housing omitted.
Figure 2:
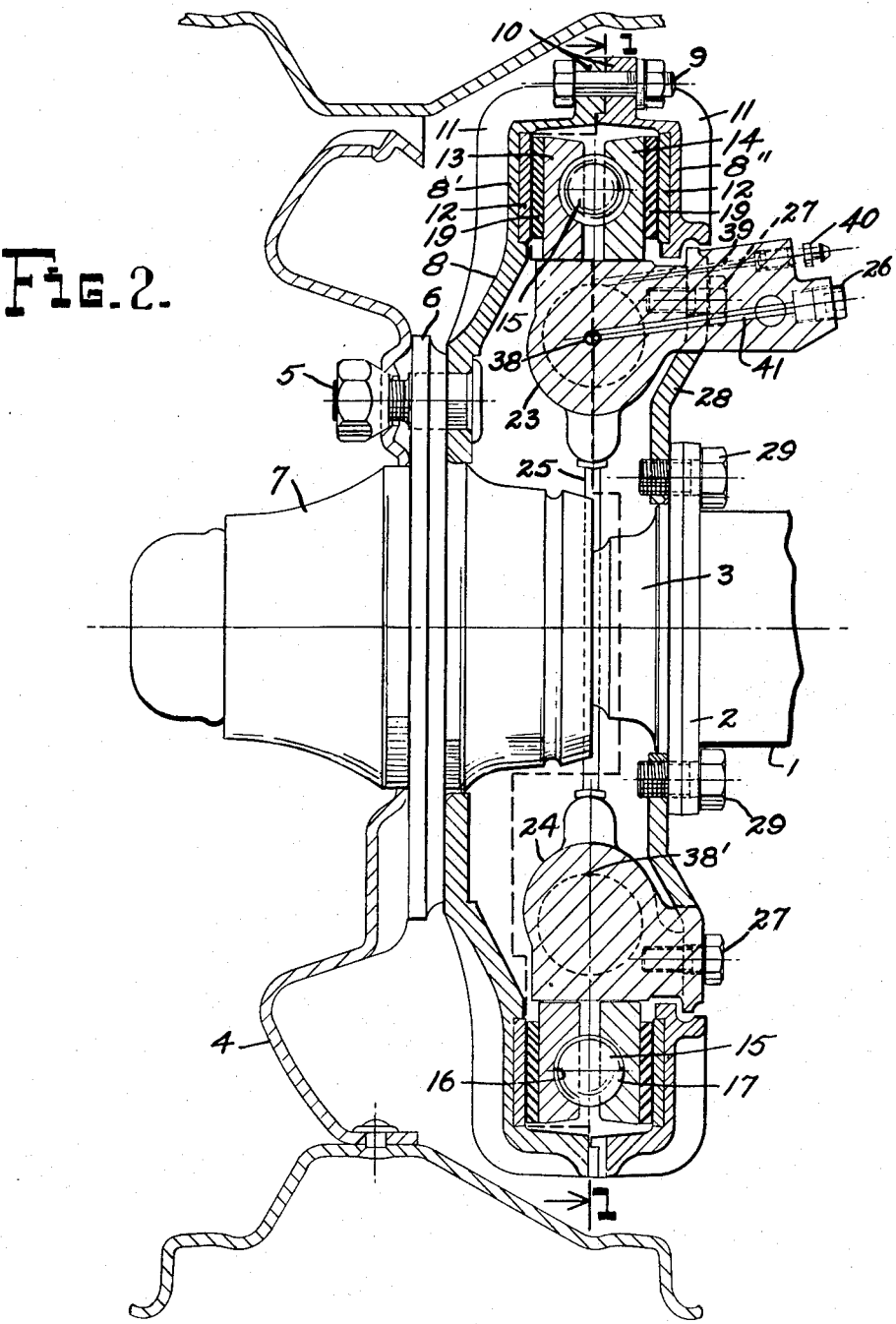
Fig. 2 is a sectional view through the entire brake assembly and an associated vehicle wheel, as taken on the line 2—2 of Fig. 1, certain of the parts being shown in elevation.

Referring first to Figs. 1 to 3 of the drawings, 1 generally denotes a conventional wheel mounting of an automotive vehicle, said mounting being provided with an annular flange 2. Extending outwardly from the flange 2 is an axle 3 on which the wheel 4 is mounted, the wheel being suitably attached, as by bolts 5, to the radially extended flange 6 of a hub 7, as is conventional in certain makes of automotive vehicles.

Also attached to the flange 6 of the hub 7 is a brake housing or casing, generally indicated at 8, which constitutes a rotary member to be braked, said housing being rotatable with the wheel 4. The casing or housing is preferably made in two parts, one of which is designated 8', and the other of which is designated 8", the two housing sections being suitably secured together as by means of a plurality of bolts or screws 9 extending through the abutting marginal flanges 10 at circumferentially spaced points about the housing. The outer faces of the housing sections 8', 8" are preferably each provided with cooling fins or ribs 11, as is customary in such brake constructions, said fins or ribs aiding in dissipating the heat generated in the brake during the braking action. The inner faces of the housing sections 8', 8" are disposed in opposed axially spaced relation to each other and provide radially disposed friction surfaces 12, 12.

Disposed within the housing 8 is a double-disc assembly or unit which is composed essentially of two flat plates or disc members respectively designated 13 and 14, the disc 13 being the outboard disc, and the disc 14 being the inboard disc. Arranged between the discs 13, 14 is a plurality of balls 15 seating in small sockets or seats 16 and 17 in the respective inner faces of the discs, the sockets or seats being oppositely inclined so as to provide camming ramps which act to force the discs 13 and 14 apart and into contact with the braking surfaces of housing 8 responsive to slight relative rotation of the discs 13, 14. The discs are yieldingly connected together by a plurality of springs 18 which serve to normally hold the discs together with the balls 15 secured therebetween, the balls 15 seating in the deepest part of the respective seats 16, 17 which are opposed to each other in axially spaced relation.

The outer faces of the discs 13, 14 preferably have segments of friction lining material suitably secured thereto, as indicated at 19, said lining material being of appropriate thickness to allow a substantial range of wear during long use of the brake, without damaging the brake. These lining segments 19 are arranged in opposed relation to the friction surfaces 12 on the housing 8, so that when the discs 13, 14 are axially spread apart by the camming action of the balls 15, a powerful braking action is exerted upon the housing 8, with consequent braking of the wheel 4 which rotates with the housing.

In order to compensate for wear of the friction linings, and to maintain a constant running or release clearance between the friction surfaces of the brake, the discs 13, 14 may be provided with suitable automatic adjusters, as indicated in broken lines in Fig. 1, and generally designated 20. The adjuster need not be further described here since the same forms no part of the present invention.

In order to support the inner double-disc assembly concentrically within the brake housing 8, and to cause slight rotative movements of the discs 13, 14 relative to each other as well as to allow relative axial movements of the discs, each disc is provided with a pair of lugs or bosses arranged at diametrically opposite points and extended from the inner periphery of the discs, the lugs or bosses on the disc 13 being indicated at 21, 21, and those on the disc 14 being designated 22, 22. These lugs or bosses are so arranged and formed that when the discs 13, 14 are assembled together, with the balls 15 therebetween, one of the lugs 21 will be in opposed relation to one of the lugs 22, but substantially spaced therefrom at one side of the assembly, while the other lug 21 will be in opposed relation to the other lug 22 and substantially spaced therefrom at the other side of the assembly, as more particularly shown in Fig. 1 of the drawings. Disposed between each pair of opposed lugs 21, 22 is a wheel cylinder or fluid operated actuator cylinder, the cylinder 23 in this form of brake being the upper cylinder or actuator, and the cylinder 24 being the lower cylinder or actuator. The two actuators 23, 24 are connected together by a pipe or tube 25 to establish pressure fluid communication therebetween, and one of said cylinders, preferably the upper cylinder 23 is connected at the back thereof with the fluid line 26 of the usual hydraulic brake system of the vehicle, said system including the usual master cylinder (not shown) which is operated by a brake pedal in the conventional manner to apply and release the brakes.

Both cylinders 23, 24 are fixedly mounted in any suitable manner, as by bolts 27, to a stationary backing or adapter plate 28, which in turn is fixed in any suitable manner, as by bolts 29, to the wheel mounting flange 2 previously referred to. The backing plate 28 lies at the inboard side of the brake assembly and extends into close proximity to the inner marginal edge of the inboard housing section 8" so as to effectively close the housing 8 against the entrance of mud, water and other foreign matter which might otherwise splash into the brake during travel of the vehicle.

As will be best understood from reference to Figs. 1 and 3, the two cylinders or actuators 23 and 24 are generally similar to each other and are preferably of the double-acting type. That is to say, each of the cylinders 23, 24 is provided with a transversely extended partition 30 located about midway of its length and defining at opposite sides thereof two piston chambers respectively designated 31, 32. Slidably mounted in each piston chamber 31, 32 is a piston 33, each piston extending to the outer end of the cylinder and somewhat beyond the same, with the extreme outer face of the piston rounded or curved as indicated at 34 so as to present minimum contact with the lugs 21 and 22 on respective discs 13, 14 of the inner disc assembly. Thus, in the case of the upper cylinder 23 in Fig. 1, the curved end 34 of the piston 33 at the left end of the cylinder abuts against the lug 21 on the disc 13, while the curved end of the other piston at the opposite end of the cylinder abuts against the lug 22 on the other disc 14. In the case of the lower cylinder 24, the piston in the lefthand end of the cylinder abuts against the lug 22 on the disc 14, which is diametrically opposite the other lug 22 coacting with the upper cylinder, while the piston at the righthand end of the cylinder 24 abuts against the lug 21 on disc 13 which is diametrically opposite the other lug 21 which coacts with the upper cylinder.

Disposed in the respective piston chambers 31, 32 and located behind the respective pistons 33 in these chambers, is a rubber or other flexible sealing cup 35. Seated in each sealing cup is a thin metal expander 36 against which one end of a coil spring 37 is seated, the opposite end of the coil spring seating against the central partition 30. The spring serves to normally yieldingly urge both the expander and the flexible sealing cup 35 against the inner end of the piston 33, while both the sealing cup and the expander are free to move inwardly and outwardly of the piston chamber along with corresponding movements of the piston.

The partition 30 of each of the cylinders or actuators is provided with an axially extended fluid passage establishing communication between the two piston chambers 31, 32 on opposite sides of the same, this passage being designated 38 in the case of the upper cylinder and being located substantially centrally of the partition 30, and being designated 38' in the case of the lower wheel cylinder and being located through the upper portion of the partition so as to permit bleeding of air from both cylinders through two bleed passages designated 39, 39 in the upper cylinder. As best shown in Fig. 1, the two bleed passages 39, 39 are located at the extreme inner ends of the piston chambers and at the highest point thereof, and lead rearwardly through the cylinder to the back thereof where they are fitted with the usual adjustable bleed valves 40. Pressure fluid is admitted to the wheel cylinders from the fluid line 26 through a passage 41 leading through the partition 30 of the upper cylinder 23 and communicating at its inner end with the passage 38 which leads into the two piston chambers of this cylinder. From one of the piston chambers is extended a passage 42 which communicates with one end of the connecting pipe or tube 25 so that the pressure fluid will fill and act upon both wheel cylinders, the opposite end of the pipe or tube 25 communicating with a corresponding passage 42' in the lower wheel cylinder, and the latter passage in turn communicating with the passage 38'.

Upon actuation of the master cylinder by operation of the usual brake pedal, the pressure fluid in the lines connected with the wheel cylinders, and in the cylinders themselves, is subjected to increased pressure which acts to force the pistons outwardly of the respective wheel cylinders, in opposite directions, thereby exerting a thrust upon the lugs 21 and 22 tending to shift the discs 13 and 14 rotatively relative to each other in opposite directions, thereby causing the camming balls 15 to climb the ramp portions of the respective recesses 16 and 17, with consequent spreading of the discs apart and into engagement with the rotary brake housing 8. This initial engagement would ordinarily tend to "clock" the inner disc assembly in the same direction as the direction of rotation of the brake housing, when the vehicle is in motion, so that it is necessary to hold one of the inner discs, preferably the inboard disc 14 relatively stationary, while leaving the other disc 13 free to rotate slightly relative to the inboard disc, so that on continuation of the pressure of the pressure fluid acting upon the wheel cylinders, together with the rotative drag or torque imparted by the housing to the outboard disc, the spreading action of the discs will continue to that extent sufficient to produce a powerful braking action upon the housing 8, and consequently upon the wheel 4.

According to the present invention, and assuming the brake housing 8 to be rotating in a counter-clockwise direction, as viewed in Fig. 1, the drag torque on initial engagement of the inner disc assembly with the housing will likewise be in a counter-clockwise direction, tending to "clock" the inner disc assembly counter-clockwise, thereby causing the lugs 22 on the inboard disc 14 to push against the pistons at the corresponding ends of both the upper and lower wheel cylinders 23, 24, inwardly until the inward movement of these pistons is stopped in some suitable manner, while at the same time the pressure fluid acts to force the pistons at the opposite ends of the respective cylinders in an outward direction and against the lugs 21 until the disc 13 has rotated a sufficient amount relative to the disc 14, with consequent camming of the discs apart by the action of the balls 15, until the required braking engagement of both discs with the housing 8 is attained.

On reversal of the motion of the vehicle, with corresponding reversal of the direction of rotation of the wheel 4 and brake housing 8, the inner disc assembly will "clock" in the opposite direction, that is, in a clockwise direction as viewed in Fig. 1, until the outboard disc 13 is stopped by an appropriate stop and becomes a relatively stationary disc, while the inboard disc 14 is left free to rotatively shift in a clockwise direction until the discs spread apart sufficiently to fully engage the housing 8 with the required braking force.

According to the present invention, the wheel cylinders 23, 24 are utilized as a stop means for limiting the clocking action of the inner disc assembly and for holding one of the inner discs relatively stationary while the other inner disc is free to shift both rotatively and axially relative to the stationary disc during brake application. As will be observed from reference to Figs. 1 and 3 of the drawings, each of the pistons 33 is provided at its extreme outer end with a radially extended annular flange 43 which overlies the extreme end of the cylinder. These flanges 43 therefore constitute stop flanges and limit inward movement of the pistons 33 into the wheel cylinders or actuators, but if said flanges were allowed to have metal-to-metal contact with the cylinders, or with some other stop, objectional noises would be created in the brake during brake application, and particularly during or following reversal of the direction of travel of the vehicle. Accordingly, cushioning means are provided to cushion the brake action and thus eliminate noises from the brake. These cushioning means include an annular ring of rubber or other resilient material, designated 44, interposed between the annular flange 43 of each piston 33 and the adjacent extreme end 45 of the cylinder. The ring 44 preferably fits snugly about the piston so as to move therewith towards and away from the adjacent end of the cylinder responsive to inward and outward movements of the piston 33. In order to reduce and minimize radial distortion of the ring 44, with consequent destruction or damage thereof under repeated cushioning actions, the resilient ring 44 is preferably confined within a metallic or other rigid sleeve 45' which embraces the same, and which is preferably also axially extended to loosely fit about the adjacent end of the cylinder so as to form a dust cover which minimizes entrance of foreign matter into the cylinder or around the pistons. The outer end of the sleeve 45′ is extended radially inwardly to form an annular flange 46 which fits snugly about the piston 33 between the resilient ring 44 and the annular flange 43 on the extreme outer end of the piston.

According to a salient feature of the present invention, a fluid cushion is provided to cushion inward movements of the pistons 33 in the respective actuator cylinders 23, 24, said fluid cushion coacting with the resilient cushioning rings 44 to relieve the latter of sudden or abrupt impacts which otherwise would result when the pistons approach the ends of their inward movements and the resilient cushions 44 engage the adjacent ends of the cylinders. By the use of such fluid cushions, the effective life and cushioning action of the resilient cushions or buffers 44 are substantially prolonged without necessitating repair or replacement of the resilient cushioning members 44. Moreover, with this type of fluid cushion, anchoring movements of the pistons is effectively silenced so that no objectionable clunk occurs upon engagement of the pistons with the cylinders, even if resilient buffers such as the buffers 44 are not provided.

The fluid cushion above referred to is attained by making the passages 38 and 38′ in the respective wheel cylinders or actuators 23, 24, of very small diameter, such as on the order of one-sixteenth inch or less. Notwithstanding the restricted or constricted size of the passages 38, 38′, the passages are of ample size to freely admit the pressure fluid into the piston chambers 31, 32 behind the opposed pistons for causing outward movement of the pistons during brake application, which movement is only very small under ordinary circumstances in brake constructions of this type to effectively apply the brake, yet on any inward movement of the pistons, the restricted passages 38, 38′ produce a momentary dash-pot effect, and the return flow of the pressure fluid is momentarily retarded before the resilient cushioning members 44 strike the corresponding ends of the cylinders. Thus, the fluid cushioning action contributes to the cushioning effect of the resilient cushions 44 and relieves the latter of sudden or abrupt impacts, thereby prolonging the life of the resilient cushions.

The cushioning actions described in the foregoing occur whenever there is any tendency of the inner disc assembly to "clock" or shift rotatively in either direction during braking application, with the result that one of the two pistons of both the upper and lower wheel cylinders or actuators 23, 24 moves inwardly until its movement is arrested by the cushioning action attending the dash-pot action of the restricted orifices 38, 38′, while at the same time, the other two pistons in the respective cylinders or actuators 23, 24 are free to move outwardly for the purpose of causing slight relative rotation of the discs 13, 14, with consequent axial separation of the discs into braking engagement with the rotary housing 8. By reason of the provision of the curved or rounded surfaces 34 on the extreme outer faces of the pistons 33, frictional contact between the pistons and the lugs 21, 22 on the respective discs 13, 14 is reduced to a minimum in every position of the discs 13, 14 during relative rotative and axial movements thereof. Consequently, the discs 13, 14 are always free to move both axially and rotatively relative to each other without appreciable frictional resistance against the pistons which concentrically support the inner disc assembly within the rotary housing in substantially freefloating or full-floating relation to the actuator cylinders.

The curved or rounded faces 34 on the extreme outer ends of the pistons 33 have the further advantage of facilitating mounting of the inner disc assembly in the brake housing 8, or removal thereof from the brake housing for purposes of repair or replacement as may be required after long use and the friction linings have become worn out. As will be obvious from reference to Figs. 1 and 2, access to the inner disc assembly of the brake may readily be attained by first removing the wheel 4 from the hub 7, after which the bolts or screws 9 around the housing 8 may then be removed and the outboard section of the housing, together with the hub 7, may be freely displaced from the axle 3. This leaves the inner disc assembly fully exposed, and the inner disc assembly may then be removed as a unit by sliding the same outwardly to disengage the lugs 21, 22 from the pistons 33 of the wheel cylinders 23, 24. A suitable clamp (not shown) is preferably utilized during such removal to hold the pistons 33 in a position with the flanges 43 and the buffers 44 pressed tightly up against the ends of the respective cylinder bodies.

After replacement of the lining segments 19 on the inner disc assembly or on substitution of a complete replacement inner disc assembly, the inner disc assembly may be restored to an assembled position by sliding the same axially inwardly to engage the lugs 21, 22 over the outer ends of the pistons 33 of the cylinders 23, 24. Normally the space between the pairs of opposed disc lugs 21, 22 is slightly greater than the over-all distance between the rounded ends of the piston noses of the respective actuators, thus providing ample clearance for easy removal and replacement of the inner disc assemblies on the actuator cylinder bodies. In addition, the inside diameter of the inner disc assembly would normally be slightly greater than the distance between the upper surface of the cylinder 23 and the lower surface of the cylinder 24. Thus, the inner disc assembly will readily slip into place over the actuator cylinders, and upon release of the clamp which holds the pistons 33 in an inward position, the inner disc assembly will automatically centralize itself in a floating position on the pistons due to the usual residual pressure in the respective actuator cylinders, and due to the expansive force of the springs 37, 37. After this, the wheel hub 7 with the outboard housing section 8′ attached thereto may be readily remounted on the axle 3 and the bolts or screws 9 restored to clamp the housing section 8′ to the housing section 8″, thereby completing the brake assembly. Thereafter, the wheel 4 may be remounted on the hub 7. Such a construction is characterized by its extreme simplicity and the ease of assembly and/or repair.

While the bodies of the actuators 23, 24 shown in Fig. 1, are disposed in substantially a horizontal position, the piston chambers and the pistons 33 are disposed at an angle to the horizontal, thereby causing the piston noses 34, 34 of the pistons of the lower wheel cylinder 24 to make supporting contact with the respective disc lugs 21, 22 so as to support the entire weight of the inner disc assembly. However, at times, due to road shocks when the brake is inactive, the inner disc assembly may tend to vibrate in a vertical direction due to the clearances between the inner disc assembly and the actuator cylinder bodies and due to the space differential between the sets of opposed lugs 21, 22 and the over-all length of the actuators and pistons. However, in addition to providing an efficient dash-pot action to prevent noise during brake applications, the restricted orifices 38, 38′ through the central partition 30 of each actuator provide a dash-pot action which effectively cushions and eliminates rattle of the disc assembly which may occur as the result of road shock.

In Figs. 4 to 11, there is shown a modified brake assembly embodying the present invention, said assembly including a housing generally designated 101 which is also preferably made in two parts that are adapted to be bolted or otherwise fastened together by suitable fastening means (not shown) which extend through spaced openings 102 which are provided about the periphery of the housing sections, the outboard section of the housing being omitted to show the interior of the brake construction in Fig. 4. The outboard section of the housing is adapted to be connected by bolts or other suitable fastening means to the usual radially extended flange of the wheel mounting hub (not shown), in the case of an automobile wheel, so that the entire brake housing or casing 101 will rotate with the wheel or other rotatable part to be braked, in either a forward or rearward direction according to the direction of movement of the vehicle or other rotary part, as the case may be.

At the inboard side of the brake housing 101 there is provided a relatively fixed or stationary backing or adapter plate generally designated 103, which forms a closure for the inboard side of the housing. This backing plate 103 is suitably fastened, as by means of bolts 104, to a flange or other part of the usual axle of the vehicle, said axle being designated 105, and in the illustrative embodiment comprising a front wheel mounting spindle of a motor vehicle.

Rigidly mounted on and fixed to the backing plate 103 is a pair of hydraulic actuator or wheel cylinders generally designated 107 and 108, respectively, these cylinders being located in diametrically spaced relation to each other, and being disposed in vertical positions, that is, with their axes extended vertically. Hydraulic lines 109, 110 branching from a fitting 111 which is rigidly supported on the brake backing plate 103, are respectively connected to the wheel cylinders 107, 108 for supplying hydraulic fluid under pressure to these cylinders, this hydraulic fluid being forced through these lines 109, 110 by means of a conventional master cylinder (not shown) of the hydraulic brake system of the motor vehicle. The fitting 111, as well as the branch lines 109, 110, are preferably located on the outside of the brake assembly at the inboard side thereof, in order to be connected to the actuator cylinders 107, 108 of this invention, both of which have a cylindrical boss 112 which is adapted to be extended through the backing plate 103 so as to project inwardly beyond the inboard face of this plate, as best seen in Fig. 6. The actuators 107, 108 are bolted to the backing plate 103, as by means of bolts 113 extending through the backing plate and into the cylinder castings of the actuators.

Disposed within the rotary brake housing 101 and surrounding the actuator cylinders 107, 108, there is provided a double-disc unit generally designated 114, said unit comprising a pair of discs of annular form which are arranged back-to-back, with a series of balls or camming members 115 disposed therebetween, said balls being seated in ramped seats formed in the opposing faces of the respective discs, and being normally held in these seats by a plurality of springs 116 yieldably connecting the two discs together. This arrangement allows the discs to move relative to each other in both a rotative direction and axial direction. Accordingly, if a limited rotative movement is imparted to one of the discs of the double-disc unit 114, while the other disc of this unit is held relatively stationary, the discs will spread apart in an axial direction, responsive to the camming action of the balls 115. As a result of this spreading action of the double-disc unit 114, the discs will frictionally engage the rotary housing 101 which is extended on opposite sides of the double-disc unit 114 so as to provide opposed axially spaced, radially disposed braking surfaces against which the double-disc unit will exert a powerful braking action, each disc of the double-disc unit preferably being provided with a series of friction lining segments 117 on the housing-engaging faces of the respective discs. Preferably, the double-disc assembly 114 includes automatic adjuster means 117' for progressively compensating for wear of the friction lining segments 117 throughout the life of these linings.

In order to actuate the discs of the double-disc assembly 114 to produce the braking action in the manner just described, one of the two discs is provided with a pair of diametrically spaced lugs 118, in each of which is rockably seated a rocker or toggle pin 119, the opposite end of each pin being in turn universally seated in the outer end of one of the pistons of the respective wheel cylinders 107, 108, which will be hereinafter described in detail. The other disc of the double-disc unit 114 is also provided with a pair of diametrically spaced lugs 120, in each of which is rockably seated another rocker pin 121, these pins in turn being universally seated in the other pistons of the corresponding actuator cylinders 107, 108.

Preferably, there is a slight clearance between the wheel cylinders 107, 108 and the inner peripheries of the discs of the double-disc unit 114 so that the discs will not actually contact the wheel cylinders in normal use of the brake, but generally speaking, the wheel cylinders 107, 108 are adapted to support the double-disc unit 114 on the rocker pins 119, 121, with the double-disc unit concentrically located and piloted by but freely floating about the actuator cylinders 107, 108.

In operating the brake shown in Fig. 4, hydraulic fluid is forced into the wheel cylinders 107, 108, between opposed pistons 122, 123 in each cylinder, thereby forcing the pistons apart, with consequent transmission of a rotative thrust against the two discs of the double-disc unit 114 and tending to rotate the respective discs in opposite directions, which in turn tends to cause the discs to move apart in an axial direction, relative to each other, responsive to the camming action of the balls 115 therebetween. As the double-disc unit engages the rotary housing 101 which is connected to a wheel or other rotary part to be braked, the frictional drag imparted by the rotary housing to the double-disc unit tends to "clock" the double-disc unit in a direction corresponding to the direction of rotation of the housing 101, thereby forcing one of the pistons of each actuator 107, 108 inwardly of the cylinders until a portion of these pistons engages a portion of the actuator cylinder, thereby stopping further clocking movements of the double-disc unit, and anchoring one of the discs of said unit against rotation, while leaving the other disc of said double-disc unit free to rotate slightly relative to the anchored disc in response to continued pressure in the actuator cylinders and the energizing force provided by the camming action of the relatively rotatable disc.

Referring more particularly to Figs. 5, 6 and 7, each wheel cylinder comprises a body 124 which is preferably a one-piece casting having a centrally located partition 125 dividing the same into opposed piston chambers 126, 127 disposed within the body 124 and extending axially therefrom in opposite directions. One longitudinal side of the body 124 is laterally extended to provide a mounting portion 128 which is adapted to butt up against the backing plate 103 of the brake assembly, with the aforementioned boss 112 projecting through said backing plate, the bolts 113 also extending through said backing plate and into the portion 128 for rigidly mounting the wheel cylinder on the backing plate 103.

The portion of the cylindrical boss 112 which projects inwardly past the inboard side of the backing plate 103 has angularly disposed faces 129 diverging toward the backing plate 103. The body 124 is provided with an inlet-outlet opening 130 extending at a right angle from one of the inclined faces 129 through the cylindrical boss 112 and into the piston chamber 127 adjacent to the central partition 125, this inlet-outlet opening being enlarged and screw-threaded, as at 131, at its outer end for connection with one of the branch lines 109, 110. The portion 128 of the body 124 is also provided with a bleed opening 132 extending into the piston chamber 126, the outer end of this opening being enlarged and screw-threaded, as at 133, for receiving a bleeder valve (not shown). The backing plate 103 is provided with an opening 134 therethrough in axial alignment with the bleed passage 132 to accommodate the aforementioned bleeder valve. The central partition 125 is provided with a relatively small fluid passage 135 therethrough, whereby fluid under pressure may be passed into the piston chamber 126 from the piston chamber 127, and vice versa, this passage 135 not only establishing communication between the piston chambers 126 and 127, but also serving to restrict the fluid flow therethrough and thus damp or cushion inward movement of the pistons 122 and 123 which may be caused by "clocking" of the double-disc unit 114 in either direction, or may be caused by vertical vibrations of the inner disc unit 114 due to road shock when the brake is released, thereby eliminating noise that otherwise would result from metal-to-metal contact of the pistons against the partition 125 in anchoring one of the discs against rotation during the braking action, or in limiting vertical vibrations of the braking unit.

The inner disc unit 114 is held in assembled relation by the tension springs 116, with the balls 115 confined between the discs and seating in the deepest part of the ramped seats. Movements of the opposed pairs of disc lugs 118 and 120 toward one another is thus limited, and a minimum spaced relationship between the opposed lugs 118 and 120 is thus established. For assembly purposes, the cylinder 124, pistons 122, 123, pins 119, 121, and the partition 125 of each actuator unit must be so constructed that clearance is provided over the ends of the pins when the pistons are in their innermost positions in the respective piston chambers, to allow assembly of the inner-disc unit 114 on the wheel cylinders. This clearance amounts to the depth of the conical seats for the pins 119, 121, plus a nominal distance to compensate for manufacturing tolerances, whereby there is some free space which would normally allow the inner-disc unit 114 to jump or vibrate in a vertical direction when subjected to road shock. However, a residual line pressure is maintained to take up this clearance or free space and maintain the respective piston pins 119, 121 and the pistons 122, 123 projected into engagement with the respective opposed disc lugs 118, 120, but this residual pressure is not sufficient to overcome the release pressure of the tension springs 116, which maintains the disc lugs 118, 120 in their minimum spaced relationship. In this manner, the residual line pressure maintains the inner-disc unit 114 in proper operative relation to the actuator 107, 108, without the aid of other connecting means. Thus, the inner-disc unit 114 is fully supported on the actuators 107, 108 and freely floats thereabout.

However, due to the vertical relation of the actuators 107, 108, the dead weight of the inner-disc unit 114 will push the upper piston of each actuator down into contact with the central partition 125, since the residual fluid pressure within the respective actuators is balanced on opposite sides of the partition 125. When a vehicle equipped with these brakes is moving, there is a certain amount of road shock transmitted to the brake, regardless of the condition of the road surface, and this road shock tends to cause the inner-disc unit 114 to bounce vertically. This vertical bouncing or vibrating is at a relatively high frequency, and the restricted orifice 135 through the partition 125 is of such restricted size as to prevent free flow of the fluid in the respective actuators from one side of the partition to the other under such vibrating conditions, and thus damps such vibratory or bouncing movements to such an extent that when the vehicle is moving, the inner-disc unit 114 will be virtually floating on the fluid within the actuator cylinders, and the upper pistons will be maintained out of contact with the central partition 125. Thus, rattle of the brake assembly due to road shock, when the brake is released, is completely eliminated.

It has been found that such rattling of the brake assembly is most efficiently eliminated when the orifice 135 through the partition 125 is of a size on the order of one-sixteenth inch or less, and preferably on the order of .043" when employing cylinders having piston chambers of about one inch to 1¼ inches in diameter, as conventionally used for pleasure automobiles. However, the orifice 135 must be of sufficient size as to permit effective bleeding of the fluid from the actuator cylinder and to also permit the free transmission of pressure through the same during brake applications. In addition, it has been found that the diameter of the inlet port 130 should be of a size less than that of the orifice 135, and preferably on the order of .03125", so that vertical bouncing or vibration of the inner-disc unit 114 will not pump fluid from the actuator cylinder back through the inlet port. Thus, the cushioning action of the restricted port 135 through the partition 125 is rendered more fully effective by this relationship of the size of the orifice and inlet port.

The pistons 122, 123 in the embodiment shown in Figs. 5, 6 and 7, each include a reduced shank 136, this shank 136 being adapted to abut against the inner partition 125 for limiting inward movement of the pistons within the piston chambers 126, 127. The outer end of each piston 122, 123 is provided with a substantially conical recess 137 in which the rocker or toggle pins 119, 121 are universally seated. The outer ends of the rocker pins 119, 121 are each provided with a substantially hemispherical head 138 which rockably seats in the lugs 118, 120 on the discs of the double-disc unit 114. The rocker pins are each provided with an annular recess 139 for receiving an annular shoulder 139' defining a central opening in a resilient dust cap 140, these dust caps 140 also having a shoulder 141' adapted to be snapped into a peripheral groove or recess 141 at each end of the body 124.

Suitable means are provided for sealing the pistons and piston chambers against the loss of hydraulic fluid and for causing the hydraulic fluid to travel in a tortuous path when the brake is being bled, said means including a flexible annular sealing ring or gasket 142 disposed about the reduced shank portion 136 of each piston 122, 123 in sealing relation with the walls of the piston chambers 126, 127. An annular expander member 143 encircles the shank of each piston, this expander having a beveled portion 144 adapted to project into the recess 145 in the sealing ring 142 to expand the sealing ring responsive to the pressure of a coiled compression spring 146 which is interposed between the expander 143 and the central partition 125, the expander 143 having an annular shoulder 147 for engagement by the spring 146.

The fluid directing means for causing the hydraulic pressure fluid to travel in a tortuous path when the brake is being bled, includes a transverse groove or recess 148 which is disposed across the inner end of the reduced shank 136 of each of the pistons 122, 123, so as to register with the small orifice 135 through the central partition 125 of the wheel cylinder. In addition, the fluid directing means includes a plurality of fluid directing passages formed in the walls of the annular member or expander 143, these passages comprising a pair or set of annularly spaced vertical grooves 149 in the outer vertical peripheral wall 150, and a second pair or set of vertically disposed passages 151 in annularly spaced relation through the shoulder 147 with which the spring 146 is engaged, this shoulder 147 also cooperatively engaging about its inner peripheral surface with the shank 136 of the pistons 122, 123 for properly positioning the expander about said pistons within the piston chambers 126, 127. The expander 143 is also provided with a third pair or set of fluid directing passages 152 disposed in annularly spaced relation in an angularly disposed continuation 144 of the wall 150. These three sets of passages 149, 151 and 152 are best shown in Figs. 8 and 9, and it will be seen that the passages 152 are annularly displaced 90° from the passages 149 and 151, although this specific relationship of the passages with respect to each other is purely illustrative, and the passages may be in any desired location with respect to each other, as may be determined by the number of passages in each set. Moreover, the details of the seal and the fluid directing passages just described in explaining the bleeding operation, are not material to the present invention, but constitute the subject of a separate copending application.

Referring now to Fig. 11, there is shown a fragmentary portion of a modified form of a wheel cylinder also made in accordance with the present invention. Generally, the details of construction of the modified form are identical to those of the construction illustrated in Figs. 5 to 10, and therefore, the reference characters applied to this figure are the same except that these reference characters have been primed and new reference characters have been applied to the modified features. In this form, the reduced shank 136' of the piston 123' is shortened to some extent and the piston chamber 127' is enlarged at its outer end to provide a stop shoulder 153 against which an enlarged head 154 on the outer end of the piston 123' is adapted to abut for limiting inward movement of the piston 123'. In this modified form, moreover, there is no need for the transverse grooves 148 with which the pistons 122 and 123 are provided, as will be apparent from the following description of the operation of a brake as shown in Figs. 4 through 11.

Assuming the brake to be mounted on the right front wheel of an automobile, and the automobile to be travelling in a forward direction with the brake housing 101 rotating in a clockwise direction as viewed in Fig. 4, depression of the usual brake pedal will cause the conventional master cylinder to force fluid into both wheel cylinders 107 and 108 through the lines 109, 110. The fluid enters the respective lower piston chambers 127 and passes upwardly through the orifice 135 of partition 125 into the upper piston chamber 126 of each actuator cylinder. Thus, the pistons 122, 123 will be forced outwardly in opposite directions to thereby impart a rotative or angular movement to the discs of the inner-disc assembly 114 in opposite directions, this rotative movement of the discs causing the balls 115 to climb the opposed ramps in the inner faces of the disc bodies to spread the discs axially into initial frictional contact with the rotating housing 101. Initial contact of the discs with the housing will cause the inner-disc assembly to "clock" along with the rotating housing 101, with the result that the disc lugs 118 on the inboard disc will force the lower piston 123 in actuator 107 upwardly and force the upper piston 124 in cylinder 108 downwardly. Thus, the fluid in the piston chamber 127 of the actuator 107 and in the piston chamber 126 of the actuator 108 will be forced back through the restricted orifice 135 in each of the partitions 125 of these actuators, but the relatively small size of the orifice 135 will effect a dash-pot action, thereby cushioning inward movements of these pistons to the extent that no "clunk" is made upon metal-to-metal contact of these pistons with the central partitions 125 as in Figs. 5 and 6, or with the stop shoulder 153 of the actuator cylinder shown in Fig. 11. Continued application of fluid pressure will continue to shift the outboard disc in a clockwise direction and the drag torque imparted to the outboard disc by the rotating housing will effectuate a powerful camming action of the balls 115, with a resultant extremely powerful braking action of the inner-disc assembly on the housing 101. Immediately upon release of the aforementioned foot pedal and consequent release of the fluid pressure in the actuators, the return springs 116 will neutralize the camming effect of the balls and return the discs to the release position shown in Fig. 4.

While the brake is in this released position, and the vehicle is moving, continued and frequent jolts or jars will be imparted to the brake assembly, causing the inner-disc unit 114 to bounce or vibrate in a vertical direction. However, the restricted orifice 135 prevents rapid directional changes of the pistons in the respective piston chambers by damping movements of the pistons towards the partitions. This damping action is effective to such an extent that during normal use, the upper piston in each actuator cylinder will not actually rest on the central partition thereof, but instead, will be suspended on the fluid body within the actuator cylinder, thus virtually eliminating any rattle or noise in the brake assembly, which otherwise might be caused by the hammering action of the pistons against the central partitions of the actuators.

While the specific details of the invention have been herein shown and described, the invention is not confined thereto, since changes and alterations may be made without departing from the spirit thereof as defined in the appended claims.

I claim:

1. A disc brake of the class described, comprising a rotary housing adapted to be connected to a rotary member to be braked, said housing having opposed radially extended and axially spaced, annular braking surfaces interiorly thereof, a fixed support disposed adjacent to said housing, a pair of fluid pressure responsive actuator cylinders fixed to said support in positions at diametrically opposite sides of the axis of rotation of said housing and each having a fluid inlet-outlet port, a double-disc friction unit disposed within said housing in concentric relation thereto and encircling said actuator cylinders in normally slightly spaced relation thereto, the discs of said friction unit being free for limited rotation relative to each other and for axial movement towards and away from each other and consequently into and out of frictional engagement with the braking surfaces aforesaid in said housing, said friction unit including meanes between the discs for producing said axial movement of the discs responsive to relative rotation thereof, resilient means connecting said discs together, a pair of axially shiftable pistons mounted in each of said actuator cylinders, means supporting said discs on said pistons for effecting relative rotation of said discs responsive to axial shifting of said pistons, the pistons in said actuator cylinders each having its axis disposed at an angle to a horizontal plane and said pistons being selectively anchorable on said actuator cylinders upon braking engagement of the discs with the housing, depending upon the direction of rotation of said housing, and a partition in each of said actuator cylinders intermediate said pistons, said partition having a restricted pressure fluid orifice therethrough for cushioning anchoring movements of either of said pistons during brake operation and for cushioning inward movements of said pistons responsive to movements of said friction unit when the brake is released.

2. A disc brake as defined in claim 1, wherein said actuator pistons each have an axial stem extending towards said partition for anchoring engagement therewith.

3. A disc brake as defined in claim 1, wherein said actuator cylinders are vertically disposed and the weight of said discs is borne by the upper piston of each actuator cylinder.

4. A disc brake as defined in claim 1, wherein said actuator cylinders are vertically disposed, and the actuator pistons each have an axial stem extending towards said partition for anchoring engagement therewith, the stem on the upper piston of each actuator cylinder being normally in engagement with said partition when the brake is inactive, with the discs supported on said partition by said upper pistons.

5. A disc brake as defined in claim 1, wherein said fluid inlet-outlet port is of a diameter less than the diameter of said restricted orifice through the partition.

6. A friction device adapted to be utilized in a hydraulic brake system in which a residual pressure is maintained while the brake is released, comprising an actuator cylinder having a pair of opposed piston chambers, a central partition separating said piston chambers, said partition having means establishing fluid communication between said chambers, a fluid inlet-outlet port extending into at least one of said chambers, a reciprocable piston in each of said chambers, a friction unit comprising a pair of friction members having lugs on the respective friction members, said lugs being spaced from each other and being disposed in opposed relation, means interconnecting said friction members and normally holding said lugs in a minimum spaced relationship, the minimum distance between said lugs being greater than the over-all length of said pistons and the thickness of said partition, said opposed lugs being disposed at opposite sides of said actuator cylinder so that the residual fluid pressure in said actuator cylinder will force said pistons outwardly into supporting engagement with the lugs on said friction members, and a rotary member adapted to be engaged by said friction members.

7. A friction device as defined in claim 6, wherein the axes of said actuator pistons are disposed at an angle to a horizontal plane, and said partition is provided with a restricted orifice therethrough for damping movements of said friction unit relative to said actuator cylinder.

8. A friction device as defined in claim 6, wherein the axes of said actuator pistons are substantially vertical, said partition being provided with a restricted orifice therethrough for damping vertical movements of said pistons, and said actuator cylinder is provided with an inlet-outlet port opening into at least one of said piston chambers, said inlet-outlet port being of a lesser diameter than said partition orifice.

9. A disc brake of the class described, comprising a rotary housing having opposed, radially extended braking surfaces interiorly thereof, a stationary support disposed adjacent to said rotary housing, a pair of fluid-pressure-operated actuator cylinders fixed to said support and projecting into said housing, said cylinders each having a central partition dividing the cylinder into opposed piston chambers, said cylinders also having a pressure fluid inlet-outlet port extending into at least one of said piston chambers, said partitions each having a restricted orifice therethrough establishing pressure fluid communication between said piston chambers, a reciprocable piston in each of said piston chambers shiftable outwardly away from said partition responsive to fluid pressure, the pistons in the respective cylinders each having a portion engageable with its cylinder to limit inward movements of the piston, and an inner double-disc assembly unit concentrically disposed within said housing about said cylinders and in spaced relation to said cylinders, said unit comprising a pair of discs disposed in back-to-back relationship, said discs being free for relative rotative movements and also being free for relative axial movements into frictional contact with the braking surfaces of the housing aforesaid, camming means between said discs to spread the discs axially apart responsive to relative rotation thereof, resilient means interconnecting said discs together, and a pair of diametrically spaced lugs on each of said discs, the lugs of one disc being disposed in opposed relation to the lugs of the other disc, said opposed lugs overlying the opposite ends of the respective actuator cylinders in spaced relation thereto, and means within each actuator cylinder to force the respective pistons outwardly into engagement with the opposed lugs on said discs, said unit being wholly supported on said pistons, and said partition orifice of each cylinder serving to prevent rapid transfer of pressure fluid from one side of said partition to the other, thereby cushioning inward movements of said pistons due to movements of said discs during brake operation and due to movements of said unit when the brake is released.

10. A disc brake of the class described, comprising a rotary housing having opposed radially extended, annular braking surfaces, a stationary support disposed adjacent to said housing, an inner double-disc assembly unit concentrically disposed within said housing, said unit comprising a pair of discs disposed back-to-back, camming means between said discs for spreading said discs axially apart responsive to relative rotation thereof, return springs interconnecting said discs together, and a pair of diametrically spaced lugs on each disc, each lug on one disc being disposed in opposed spaced relation to a lug on the other disc, a pair of fluid-pressure-operated actuator cylinders disposed in diametrically opposite positions and fixed to said support, each actuator cylinder having a pair of opposed piston chambers having axially shiftable pistons therein, the unit aforesaid being concentrically disposed within said housing and about said actuator cylinders in spaced relation to said actuator cylinders, said unit being supported by engagement of the respective opposed disc lugs with the pistons of the respective actuator cylinders, each actuator cylinder being provided with means for preventing rapid movements of said pistons inwardly of the actuator cylinders when the brake is released, said pistons in each actuator cylinder being shiftable in opposite directions responsive to fluid pressure to shift the discs relatively in opposite directions, said camming means serving to shift said discs axially apart into braking engagement with the braking surfaces aforesaid, said unit being free to slightly clock as a whole upon engagement of the discs with the braking surfaces of the housing, cooperative means on the respective pistons and said actuator cylinders for anchoring clocking movements of one disc or the other depending upon the direction of rotation of the housing, and said means for preventing rapid movements of the pistons when the brake is released serving to cushion anchoring movements of either piston of the respective actuator cylinders.

11. A disc brake as defined in claim 10, wherein the means for preventing rapid movements of said pistons inwardly of the actuator cylinders comprises a central partition in each actuator cylinder, each partition having a restricted orifice therethrough to prevent rapid flow of pressure fluid from one side of said partition to the other, and a pressure fluid inlet-outlet port extending into at least one of said piston chambers, said inlet-outlet port being of a diameter less than the diameter of said partition orifice.

12. A friction brake, comprising a rotatable member having opposed friction surfaces therein, a relatively stationary inner double-disc unit comprising a pair of relatively rotatable and axially shiftable discs movable towards and away from the friction surfaces of said member for braking engagement therewith, camming means between said discs for spreading said discs axially apart responsive to relative rotation thereof with respect to each other, a pair of diametrically spaced lugs on each of said discs disposed in opposed relation to the respective lugs on the other disc, fluid-operated actuator means for slightly rotating said discs relative to each other for actuating said discs into frictional engagement with the rotary member to be braked, said fluid-operated actuator means comprising a hydraulic cylinder having opposed piston chambers therein, an axially shiftable piston in each of said piston chambers, said pistons being in supporting engagement with the opposed lugs on said discs, with the inner discs supported by said pistons, and cushioning stop means for limiting inward movements of said pistons responsive to the braking torque applied to the inner-disc unit upon engagement of said discs with the rotary member to be braked, said cushioning stop means comprising a central partition in said actuator cylinder having a relatively small fluid passage extending longitudinally therethrough and establishing communication between said opposed piston chambers and constituting a restricted passage for causing a dash-pot cushioning of inward movements of said pistons.

13. A fluid pressure responsive actuator for use in a brake having a friction unit adapted to be wholly supported by said actuator in such a manner that road shock tends to cause the unit to bounce, and said unit including a pair of friction elements shiftable in opposite directions to engage the brake, and said friction elements being selectively anchorable to allow self-energization of the friction unit responsive to the drag torque of an element being braked, said actuator comprising a cylinder body, a pair of opposed piston chambers in said body, a reciprocable piston in each piston chamber, each of said pistons having a portion anchorable on a portion of said body to limit inward movements of said pistons, said body being provided with a central partition between said pistons having a restricted orifice therethrough establishing fluid communication between said piston chambers, an inlet-outlet port extending into at least one of said piston chambers for enabling fluid under pressure to be applied to both pistons, said partition orifice being of a size small enough to prevent rapid transfer of fluid from one side of the partition to the other during anchoring movements of said pistons and during bouncing movements of the friction unit aforesaid, but being of a size large enough to allow transfer of fluid therethrough to apply operative pressure to both pistons, and said inlet-outlet port being of a size smaller than said orifice so as to prevent back flow of fluid during transfer flow of fluid through said partition orifice, but being large enough to allow pressure fluid to enter into and exhaust from said cylinder.

References Cited in the file of this patent

UNITED STATES PATENTS

| | | |
|---|---|---|
| 2,375,855 | Lambert | May 15, 1945 |
| 2,526,149 | Myers et al. | Oct. 17, 1950 |
| 2,575,963 | Kershner | Nov. 20, 1951 |
| 2,595,859 | Lambert et al. | May 6, 1952 |
| 2,595,860 | Lambert et al. | May 6, 1952 |
| 2,603,952 | Dodge | July 22, 1952 |
| 2,637,976 | Myers et al. | May 12, 1953 |